United States Patent
Buckland et al.

(10) Patent No.: US 6,513,484 B1
(45) Date of Patent: Feb. 4, 2003

(54) BOOSTED DIRECT INJECTION STRATIFIED CHARGE GASOLINE ENGINES

(75) Inventors: Julia Helen Buckland, Dearborn, MI (US); Rodney John Tabaczynski, Northville, MI (US); Ilya Vladimir Kolmanovsky, Ypsilanti, MI (US); Jing Sun, Bloomfield, MI (US); Richard Walter Anderson, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/518,304

(22) Filed: Mar. 3, 2000

(51) Int. Cl.[7] .................................................. F02B 17/00
(52) U.S. Cl. .................. 123/295; 123/305; 123/568.12; 60/605.2
(58) Field of Search ................................. 123/295, 305, 123/568.12; 60/605.2

(56) References Cited

U.S. PATENT DOCUMENTS

| | | | |
|---|---|---|---|
| 4,037,412 A | | 7/1977 | Jones |
| 4,873,961 A | | 10/1989 | Tanaka |
| 4,969,429 A | | 11/1990 | Bartel et al. |
| 5,052,360 A | | 10/1991 | Ingle, III et al. |
| 5,125,235 A | | 6/1992 | Yanagihara et al. |
| 5,299,423 A | | 4/1994 | Shiozawa et al. |
| 5,363,652 A | | 11/1994 | Tanaka et al. |
| 5,365,908 A | | 11/1994 | Takii et al. |
| 5,386,698 A | | 2/1995 | Kamel |
| 5,666,916 A | * | 9/1997 | Fujieda et al. ............... 123/295 |
| 5,706,790 A | | 1/1998 | Kemmler et al. |
| 5,794,445 A | * | 8/1998 | Dungner ..................... 60/605.2 |
| 5,806,482 A | * | 9/1998 | Igarashi et al. ............. 123/259 |
| 5,826,559 A | * | 10/1998 | Ichimoto et al. ............ 123/295 |
| 5,865,153 A | * | 2/1999 | Matsumoto .................. 123/299 |
| 6,055,948 A | * | 5/2000 | Shiraishi et al. .......... 123/90.15 |
| 6,182,636 B1 | * | 2/2001 | Russell et al. .............. 123/399 |
| 6,209,530 B1 | * | 4/2001 | Faletti et al. .......... 123/568.21 |
| 6,219,611 B1 | * | 4/2001 | Russell ....................... 701/105 |
| 6,234,139 B1 | * | 5/2001 | Taga et al. .................. 123/295 |
| 6,279,551 B1 | * | 8/2001 | Iwano et al. ................ 123/564 |
| 6,314,735 B1 | * | 11/2001 | Kolmanovsky et al. .... 60/605.2 |

OTHER PUBLICATIONS

*9960600—Combustion Control Techniques for Direct Injection SI Engine*, By T. Kume, Y, Iwamoto, K. Lida, M. Murakami, K. Kishino and H. Ando.

* cited by examiner

Primary Examiner—Gene Mancene
Assistant Examiner—Arnold Castro

(57) ABSTRACT

An arrangement of a four cycle internal combustion engine 7 is provided. In the preferred embodiment the engine 7 has a plurality of combustion chambers 18 having reciprocating pistons 22 mounted therein. A fuel injector 80 is provided for each combustion chamber. The fuel injector injects a stratified 80 charge into the combustion chamber 18 upon a compression stroke of the piston 22. An intake manifold 32 is provided to provide air to each combustion chamber. A charging device 38 is provided to pressurize the air within the intake manifold 32. Preferably the charging device is a variable geometry turbocharger 38. The pressurizing of the air within the intake manifold 32 allows the engine 7 to extend the stratified charge operation of the engine 7 and facilitates in increased gas mileage by allowing the engine 7 to stay in a stratified mode of operation longer than prior stratified charged internal combustion engines.

20 Claims, 6 Drawing Sheets

BOOSTED DIRECT INJECTION STRATIFIED CHARGE GASOLINE ENGINES

FIELD OF THE INVENTION

The field of the present invention is that of an arrangement of a direct injection stratified charged (DISC) gasoline engine and methods of operation thereof. More particularly, the field of the present invention is that of a DISC gasoline engine which has a boost device to extend the range of stratified charging of the engine.

BACKGROUND OF THE INVENTION

In a carbureted four cycle engine, gasoline is added to the incoming air in a carburetor. The gas and air mixture is then admitted into a cylinder combustion chamber by an inlet poppet valve during an intake stroke of a reciprocating piston, which is slidably mounted within the combustion chamber. In a modern port fuel injected (PFI) engine, fuel injectors input a specific measured amount of fuel at ports adjacent the inlet poppet valves. In a manner as previously described, the fuel and air are admitted into the combustion chambers.

Recent advancements in fuel system technology have allowed implementation of a direct fuel injected gasoline engine. In a direct fuel injected engine, air is also admitted into the combustion chamber by a poppet valve. However, each combustion chamber has a separate fuel injector which charges fuel directly into the combustion chamber.

A direct injection engine can operate in a manner similar to a conventional PFI engine by injecting fuel during an inlet stroke of the piston. Normally when the fuel is injected during the inlet stroke of the piston, there is time before ignition for substantial mixing of the fuel with the air. Accordingly, the air to fuel ratio (AFR) of the mixture within the combustion chamber will be essentially homogenous. Engines can operate with homogeneous charge at AFRs ranging from slightly rich of stoichiometry to approximately 24:1. The rich and lean AFR limits depend on specific engine design.

With appropriate design, a direct injection engine can also operate in an unthrottled manner similar to that of a diesel engine. This type of engine is called a direct injection stratified charge (DISC) engine. In the DISC engine the injection of fuel into the combustion chamber may be delayed until the compression stroke of the piston. With this strategy, the fuel does not have as much time to mix with the air. Accordingly, the AFR within the combustion chamber is stratified. Typically, the highest concentration of fuel will be in an area adjacent to the spark plug, which will have a stoichiometric mixture or a mixture slightly rich of stoichiometry. The other regions of the combustion chamber will be very lean. The resultant overall AFR may range from 20:1 to 50:1. The rich and lean AFR limits depend on specific engine design. Typically the preferable AFR will be 25:1 to 40:1.

The DISC engine has a major advantage in fuel economy by virtue of its high AFR with stratified charge operation. The increased air requirements, compared to conventional engines operating at stoichiometry, lead to improved fuel economy through reduction in pumping work and higher thermal efficiency. This decrease in fuel consumption results in lower $CO_2$ emissions. This line of reasoning also holds for a homogeneous charge that is lean of stoichiometry regardless of the engine type.

Due to high air flow requirements, stratified and homogeneous lean operation is restricted to low speed and torque conditions for naturally aspirated DISC engines. At higher torque or speed levels, prior DISC engines could not maintain the mandated high AFR. Since operating at stoichiometry or rich of stoichiometry is less fuel efficient, fuel economy suffers at higher torque and speed conditions.

It would be desirable to provide a DISC gasoline engine arrangement which could extend the stratified charge and/or homogeneous lean charge operation to a wider engine operational range.

SUMMARY OF THE INVENTION

The present invention brings forth a boosted, four cycle, spark ignited, direct injection, internal combustion engine arrangement that is capable of operating with a stratified charge. The engine arrangement of this invention improves fuel economy and $CO_2$ emissions. The above-noted improvements are accomplished by pressurizing the manifold feeding the combustion chambers such that the DISC engine of the present invention maintains a stratified charge operation in a higher range of engine speed and torque levels. Additionally, a preferred embodiment of the present invention provides for improvements in vehicle emissions. In the alternate preferred embodiment the DISC engine of the present invention is boosted using a variable geometry turbocharger (VGT). The VGT allows direct control of exhaust manifold conditions leading to enhanced control of EGR and exhaust gas temperatures, which can improve tailpipe emissions. The use of the VGT allows the preferred engine arrangement of the present invention to go from a stratified charge operation to lean homogeneous charge operation at high levels of torque and/or speed demand. The VGT also allows the engine arrangement of the present invention to remain in the lean homogeneous charge operation for a higher percentage of peak engine output. At wide-open throttle (WOT) the preferred engine arrangement can revert to a stoichiometric or rich homogeneous operation. To allow engine operation at homogeneous charge and to enhance the control of the AFR during stratified operation, there is provided a throttle body. To further enhance the operation of the engine arrangement there is optionally provided an intercooler.

These and other features and advantages of this invention will become apparent to those skilled in the art from the following detailed description and accompanying drawings illustrating features of this invention by way of example.

DETAILED DESCRIPTION OF THE DRAWINGS

Figure 2:
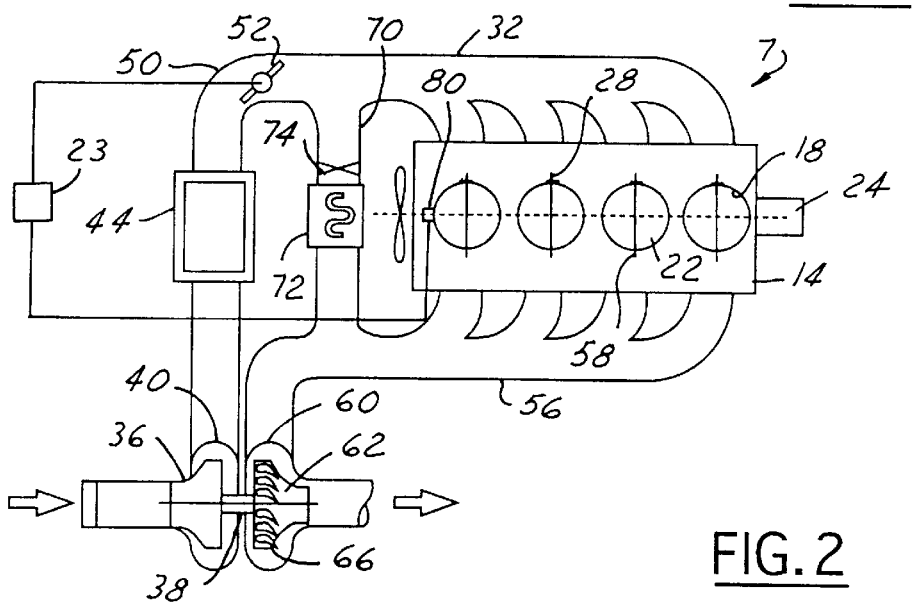
FIG. 2 is a schematic diagram of a preferred embodiment of a DISC engine with a VGT and EGR bypass.

Referring to FIG. 2, an arrangement of a DISC engine 7 according to the present invention has a conventional cylinder 14 block with a plurality of cylinder combustion chambers 18. The DISC engine 7 is a four cycle engine and each combustion chamber 18 has a reciprocating piston 22 slidably and sealably mounted therein. Each piston is pivotally connected with a piston rod (not shown), which is in turn pivotally connected with a crank shaft 24 of the engine. Each combustion chamber 18 is fluidly connected via conventional inlet poppet valve 28 with an intake manifold 32. The intake manifold 32 is pressurized by a compressor 36 of a variable geometry turbocharger (VGT) 38. The compressor 36 of the turbocharger 28 has an outlet 40, which feeds into an optional intercooler 44. A throttle body 52 is inserted in an intake passage 50 to allow control of airflow. The DISC engine 7 has for each combustion chamber 18 a fuel injector 80 (only one shown). The exhaust of the DISC engine 7 is delivered from the combustion chambers 18 to an exhaust manifold 56 via conventional poppet valves 58. The exhaust manifold 56 is fluidly connected with an inlet 60 of a turbine of the VGT 38. The turbine 62 has an outlet 64, which is connected with an exhaust pipe and the exhaust gas treatment devices located downstream. An exhaust gas recirculation (EGR) bypass 70 is provided which fluidly connects the exhaust manifold 56 with the intake manifold 32. Within the exhaust bypass 70 is an EGR valve 74 and an optional EGR cooler 72.

Figure 11:
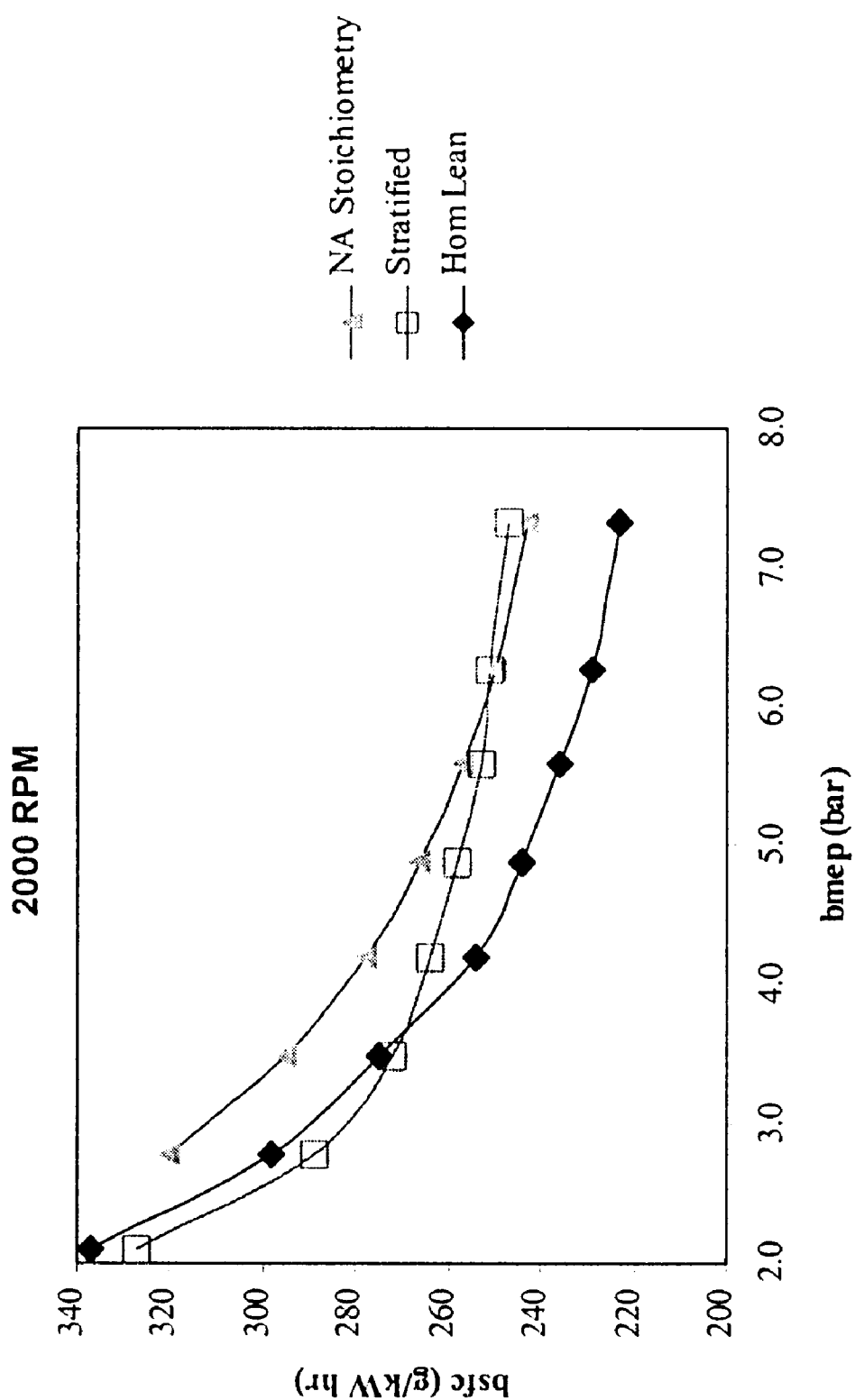
FIG. 11 is a graphic illustration of the effect of charge composition on fuel consumption obtained via simulation.

A DISC engine 7 can operate with either a stratified or homogeneous charge composition. When operating with homogeneous charge, the composition can be further classified as lean, stoichiometric or rich. The most efficient charge composition varies with engine speed and load. The variation with load is illustrated in FIG. 11 for a typical DISC engine boosted with a VGT operating at an engine speed of 2000 revolutions per minute (rpm). It is seen that, for the system simulated in FIG. 11, stratified and homogeneous lean charge compositions result in the lowest fuel consumption. At 2000 rpms at 3.6 bar bmep the homogeneous lean operating regime of the stratified engine becomes more fuel efficient. The cross over point between the fuel efficiency of stratified operation and lean homogeneous operation varies with the rpm operation of the engine. The top and the most fuel inefficient operation is represented by an engine with similar displacement which is naturally aspirated operating at a stoichiometric level. Therefore, extending the stratified and homogeneous lean charge operating regimes to higher engine speeds and loads can positively affect fuel economy.

During stratified charge operation, the fuel is charged into the combustion chambers 18 by the injector 80 during the compression stroke. The optimum time of injection depends on specific engine 7 design and engine operating condition. Also during stratified operation the throttle body 52 will typically be in its most open position. However, the throttle body 52 will be adjusted to refine the AFR to a value commanded by an engine controller 23 (FIG. 2). The exhaust gas temperature may be controlled by the utilization of movable vanes 66 in the turbocharger turbine 62. The intercooler 44 adds to the volumetric efficiency of the engine 7. The improvement in efficiency depends on the specific intercooler 44 design.

At some conditions, the DISC engine 7 of the present invention will operate with homogenous charge. When the engine 7 operates with.homogeneous charge, the injectors 80 inject fuel into the combustion chambers 18 during an intake stroke of the pistons 22. The throttle body 52 is a required component when the engine 7 operates with homogenous charge.

The engine controller 23 will operate by an algorithm, which will convert the engine 7 operation between the various charge compositions according to a strategy that best suits overall system requirements. To achieve best fuel economy for the particular engine used in this example, the controller 23 will demand stratified operation at relatively low engine speed and torque. The stratified operation AFR will typically be between 25:1 to 40:1. When the engine speed and torque demands reach a higher level where stratified operation is no longer desirable, the controller 23 will demand homogeneous lean operation, which has an AFR ranging from slightly lean of stoichiometry to 24:1, depending on the specific engine 7 design. At conditions where fuel economy is secondary to engine performance requirements or emissions (typically very high demand conditions), the controller 23 may demand stoichiometric operation or operation slightly rich of stoichiometry.

Figure 3:
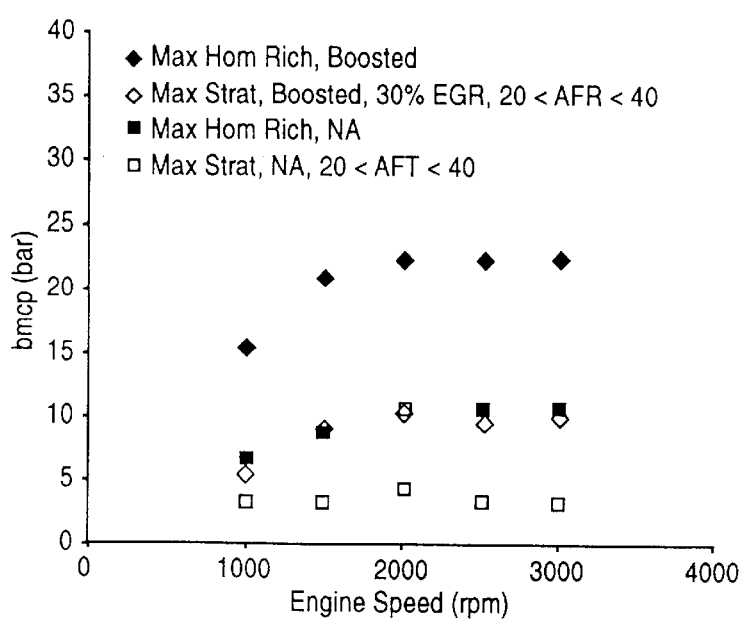
FIG. 3 is a graphic illustration of simulation results showing a DISC engine operating envelope in terms of torque and engine speed. The following operating regimens are shown: 1) the stratified charge operating envelope of a naturally aspirated DISC engine; 2) the total operating envelope of a naturally aspirated DISC engine where maximum engine speed and torque occur with homogenous charge rich of stoichiometry; 3) the stratified charge operating envelope of a boosted DISC engine with thirty percent EGR; and 4) the total operating envelope of a boosted DISC engine where maximum engine speed and torque occur with homogenous charge rich of stoichiometry.

FIG. 3 illustrates the relationship of the extended range of stratified operation brought forth by the present invention. With a naturally aspirated DISC engine the engine is only capable of operating in the stratified mode of operation at lower torque levels. Boosting the stratified engine according to the present invention greatly increases the range of stratified operation of the engine. Similarly, the homogeneous lean operating regime is extended. Accordingly, gasoline mileage can be substantially increased. It should be noted that FIG. 3 is from simulated data and actual results may differ, however, the significance of the relationship still holds.

Figure 4:
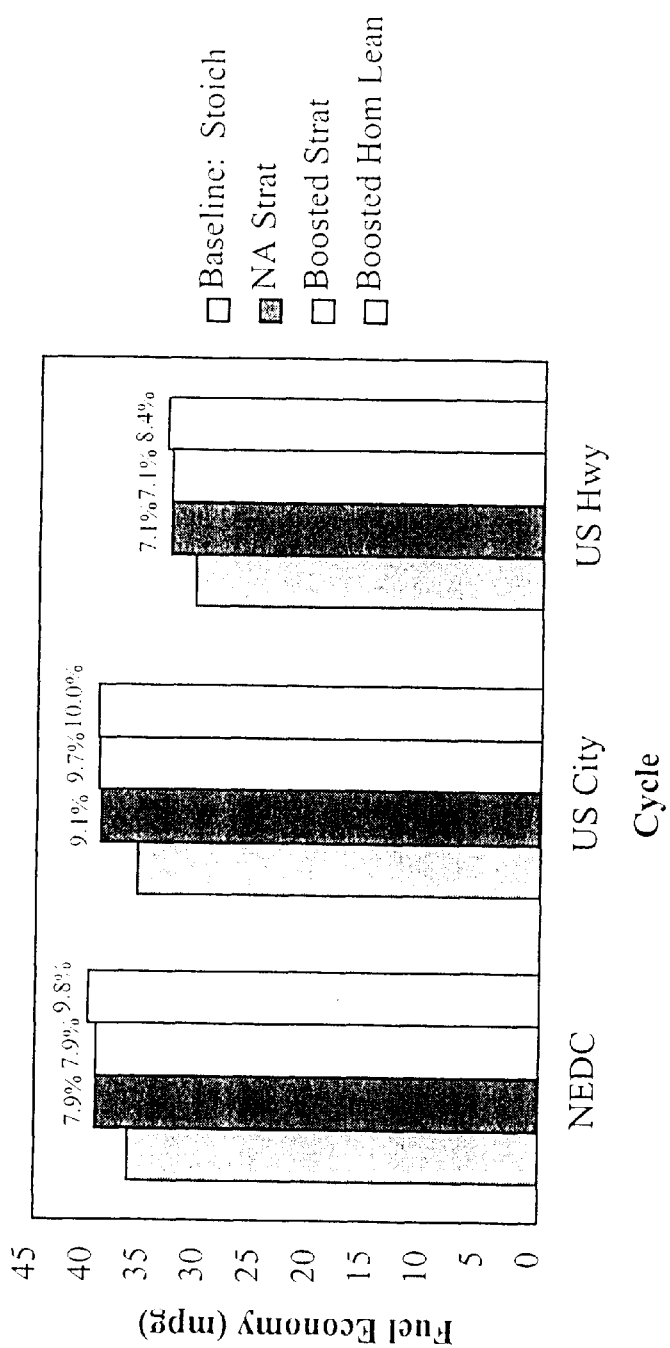
FIG. 4 is a graphic illustration of fuel economy, unconstrained by emissions and calculated via simulation, over various operational cycles of a naturally aspirated DISC engine operating at stoichiometry at all times; a naturally aspirated DISC engine operating with stratified charge when possible; a boosted DISC engine operating with stratified charge when preferable according to the present invention; and a boosted DISC engine operating with homogeneous lean charge when more efficient according to the present invention in a typical mid size car. Included is a side bar showing the amount of time spent during each cycle with stratified and/or homogeneous lean charge composition.

Referring to FIG. 4, a demonstration of the fuel economy benefits, as calculated via simulation, of the present invention is provided. The various operating strategies of FIG. 4 are considered in a mid-size car and evaluated over a European cycle (NEDC), a U.S. city cycle (EPA75) and a U.S. highway cycle (EPA Highway Fuel Economy). The first type of bar demonstrates the fuel economy, unconstrained by emissions, of a mid-size car with a naturally aspirated DISC engine 7 operating at stoichiometry at all times. The second bar illustrates the unconstrained fuel economy improvements for the same vehicle with a naturally aspirated DISC engine 7 operating with stratified charge at low engine speeds and torques. The third bar represents the improvements due to the utilization of boost to extend the stratified charge operating regime of the DISC engine 7 according to the present invention. The fourth bar demonstrates the unconstrained fuel economy improvement resulting from extending the homogeneous lean operating regime via boost as per the present invention. A side bar presents information on the time spent in the stratified and/or homogeneous leans modes of operation during each cycle for each operating strategy. An improvement in unconstrained fuel economy is seen for each cycle when extending the homogeneous lean operating regime via boost. Although unconstrained fuel economy is not improved when extending the stratified operating regime with boost, potential for improvement remains when considering emission constraints. Research in diesels has shown improvements in both fuel economy and NOx emissions when using a variable geometry turbine as compared with a conventional turbocharged system. In addition, it is seen that a relatively small amount of time is spent at high speed and load conditions during the cycles evaluated here. This leads to the conclusion that boosting to extend lean operating regimes will provide the most benefit for drive cycles where more time is spent at higher load conditions. Thus implementation of this invention may lead to improved fuel economy and higher satisfaction for customers with driving styles resulting in engine loads higher than typical regulatory drive cycles.

Figure 5:
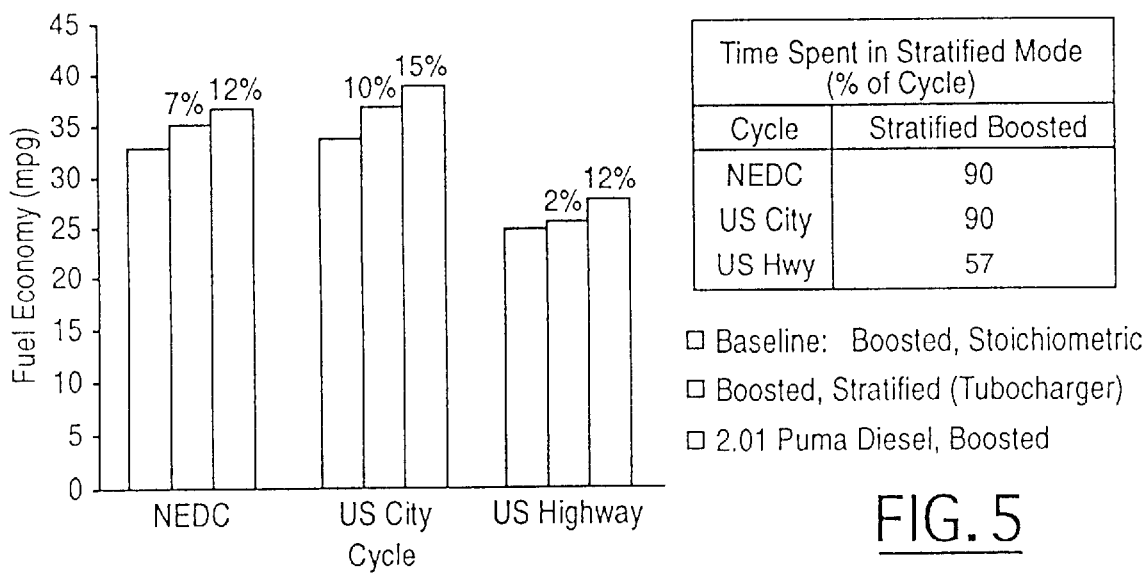
FIG. 5 is a graphic illustration showing fuel economy, unconstrained by emissions and calculated via simulation, over various operational cycles of a boosted DISC engine operating at stoichiometry at all times; a boosted DISC engine operating with stratified charge whenever preferable and a boosted diesel engine in a typically sized sport utility vehicle (SUV). Included is a side bar showing the amount of time spent during each cycle with stratified charge.

FIG. 5 illustrates the improvement in unconstrained fuel economy, calculated via simulation, in a typical SUV with the DISC engine 7 (second bar in each cycle) according to the present invention as compared with a boosted engine (first bar in each cycle) operating at stoichiometry. It is shown that significant potential gain in fuel economy is provided over naturally aspirated gasoline engines.

Figure 1:
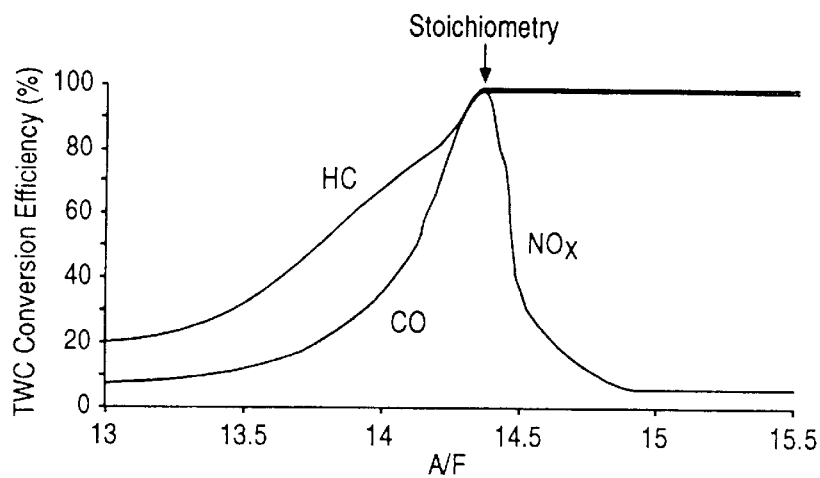
FIG. 1 is a graphic illustration of the conversion efficiency of a typical three-way catalyst (TWC) versus AFR in the treatment of hydrocarbons (HC), carbon monoxide (CO) and oxides of nitrogen (NOx) emissions of an internal combustion engine.
Figure 7:
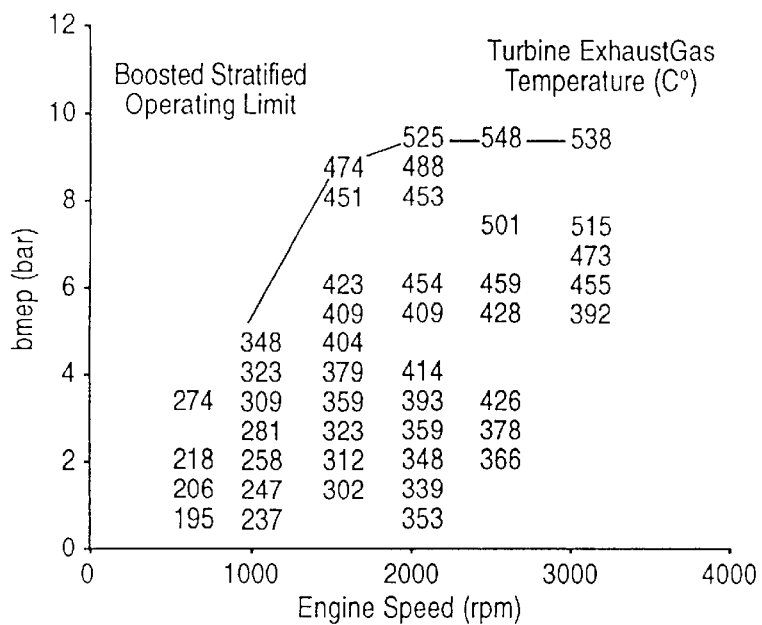
FIG. 7 is a graphic illustration showing turbine exhaust gas temperature profile in relationship to the engine torque and speed.
Figure 8:
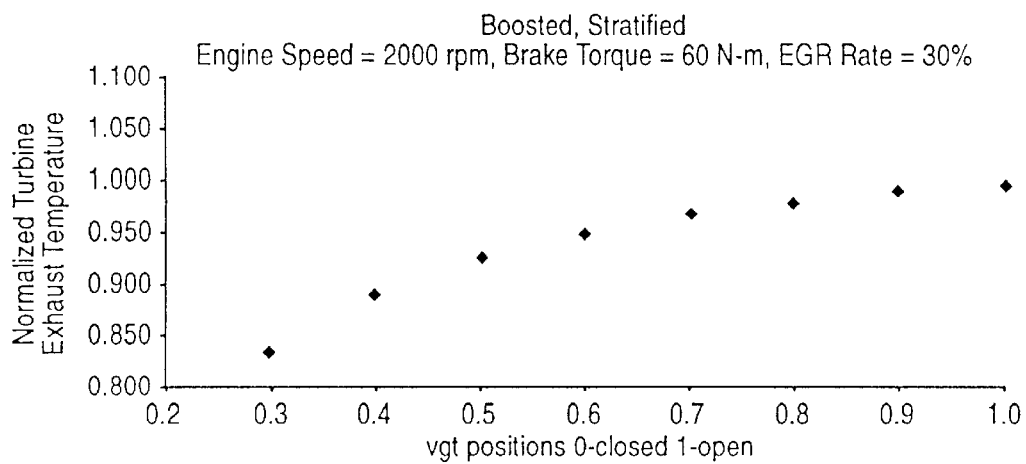
FIG. 8 is a graphic illustration showing turbine exhaust gas temperature control of a boosted stratified engine.

This benefit in fuel economy is inconsequential if emissions cannot be managed. The VGT 62 provides additional flexibility which can be used to address NOx emission constraints through enhanced EGR delivery and exhaust gas temperature control. Referring to FIG. 1, it is shown that at AFRs beyond stoichiometry the NOx conversion efficiency of a three way catalyst is greatly reduced. Accordingly, with lean AFR engines it is often required to use a lean NOx trap (LNT) or lean NOx catalyst (LNC). These devices are most effective within a small temperature window, making temperature management necessary for implementation of any lean burn engine technology. With a VGT, the temperature of the exhaust gas entering the after-treatment device can be electronically controlled. An example of the above-noted approach to temperature management is graphically presented in FIGS. 7 and 8. The exact graphic relationships will vary with engine design and operating regimen.

LNTs also have limited capacity and must be purged periodically via homogeneous rich operation. To minimize the amount of time spent in purge mode and the resulting increase in fuel consumption, engine out NOx must be reduced as much as possible. The conventional approach to NOx reduction is introduction of EGR. During lean operation, EGR consists of air as well as burned gas. Therefore higher levels of EGR must be introduced to achieve the same levels of burned gas in the cylinder.

Figure 6:
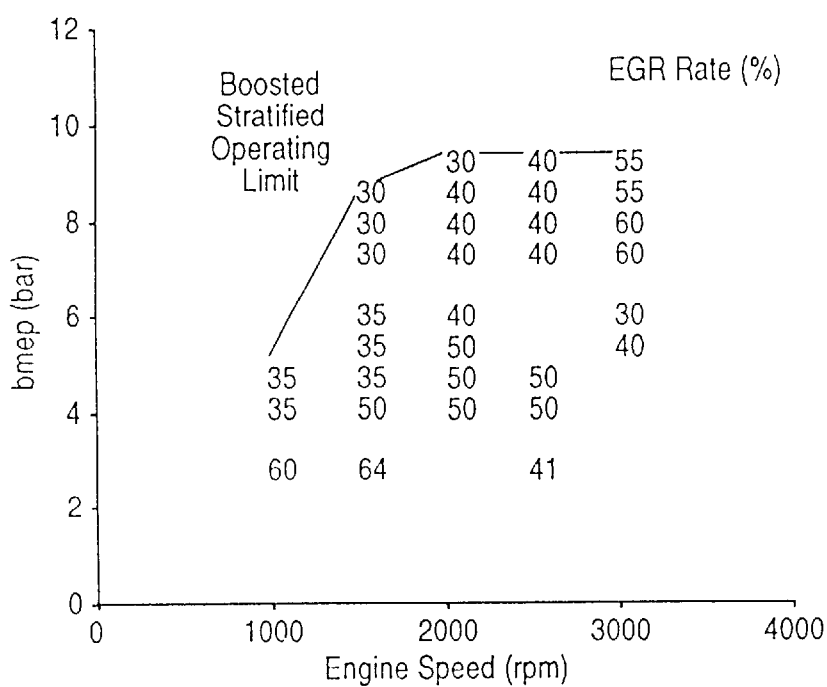
FIG. 6 is a graphic illustration showing EGR delivery capability for a boosted DISC engine. The data was obtained via simulation.

Boosting increases the pressure of the intake manifold making introduction of EGR with a conventional EGR valve more difficult. When a turbocharger is used the pressure in the exhaust manifold is increased allowing adequate EGR rates at some operating points. When adding the flexibility of a variable geometry turbocharger 28, the turbine inlet vanes 66 can be positioned to improve EGR delivery through control of exhaust manifold 56 pressure. Coordinated control of the variable geometry turbine vanes 66 and the throttle body 52 can provide an effective means for delivering large EGR rates required for DISC engine 7 operation. FIG. 6 depicts the maximum EGR delivery percentage possible at a number of stratified operating points for the engine 7 equipped with a variable geometry turbocharger 38. This data was obtained via simulation.

Figure 9:
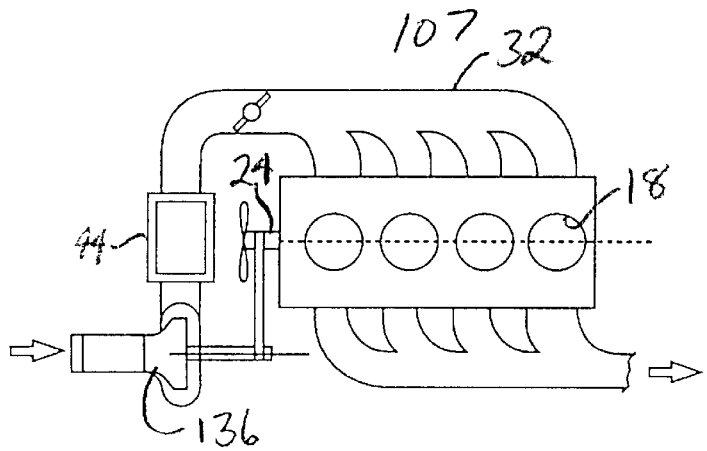
FIG. 9 is a schematic diagram of an alternate preferred embodiment super charged DISC engine according to the present invention.

Referring to FIG. 9 an alternate preferred embodiment engine 107 according to the present invention is shown having a mechanical supercharger boost device. Boost is provided by a compressor 136 which is driven by the engine crank shaft 24. An intercooler 44 is also provided. The operation of the engine 7 is similar to that as previously described for engine 7. However, control of exhaust conditions will have to be by a different regimen. Simulation has shown that unconstrained fuel economy of the engine 107 is essentially equivalent to the unconstrained fuel economy of the engine 7. However when supercharging, the pressure in the intake manifold 32, is raised to levels higher than engine exhaust pressures. Therefore the introduction of EGR with a conventional EGR valve is not possible. Accordingly, EGR must be introduced by some other appropriate means.

Figure 10:
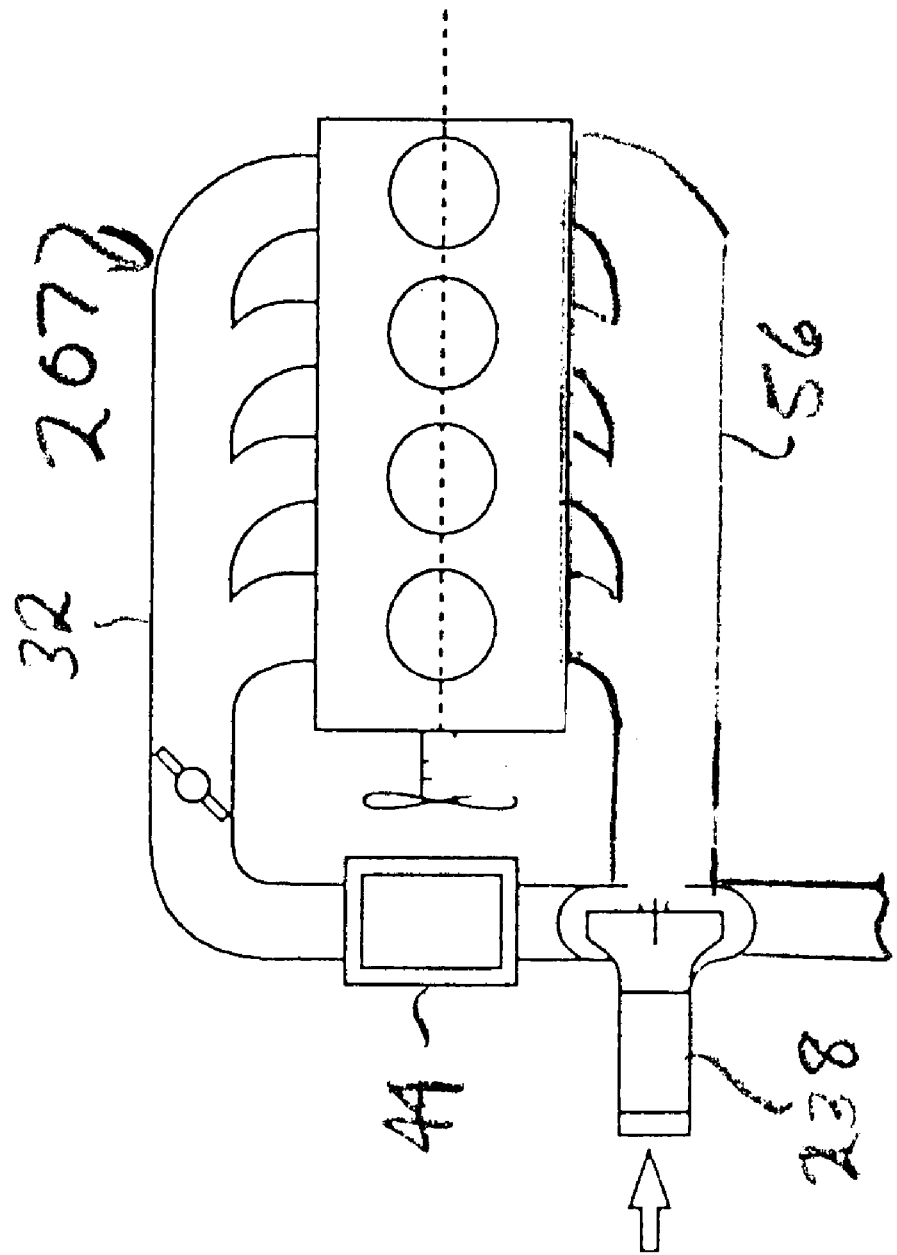
FIG. 10 is a schematic diagram of another alternate preferred embodiment pressure wave comprex supercharged DISC engine according to the present invention.

Referring to FIG. 10 a schematic diagram of still another alternate preferred embodiment engine arrangement 207 is presented. The engine 207 is similar to those previously described with the exception that it has a manifold 32 which is charged by a pressure wave comprex supercharger 238. A motor (not shown) which is electrically or mechanically driven, rotates the comprex supercharger 238 at a rotational speed which is typically three-to-four times rotational speed of the crankshaft 24 of the engine. The comprex supercharger works on the principle that gases tend to equalize pressure before they mix. Accordingly, the exiting exhaust from the exhaust manifold 56 is fed into elongated chambers within the interior of the supercharger comprex 238 to pressurize the incoming air which is in turn fed to the intake manifold 32.

While preferred embodiments of the present invention have been disclosed, it is to be understood that it has been described by way of example only and that various modifications can be made without departing from the spirit and scope of the invention as it is encompassed by the following claims.

We claim:

1. An arrangement of a four cycle, spark-ignited, gasoline internal combustion engine comprising:

at least one combustion chamber having a reciprocating piston mounted therein;

a fuel injector for injecting fuel into said combustion chamber on a compression stroke of said piston to provide a stratified charge into said combustion chamber;

an intake manifold to provide air to said combustion chamber;

a charging device to pressurize the air within said intake manifold.

2. An arrangement of an internal combustion engine as described in claim 1, wherein said charging device is a turbocharger.

3. An arrangement of an internal combustion engine as described in claim 2, wherein said turbocharger is a variable geometry turbocharger.

4. An arrangement of an internal combustion engine as described in claim 3, wherein said variable geometry turbocharger has moveable vanes in a turbine portion of said turbocharger.

5. An arrangement of an internal combustion engine as described in claim 1, wherein said charging device is a super charger.

6. An arrangement of an internal combustion engine as described in claim 1, wherein said charging device is a pressure wave supercharger such as a comprex.

7. An arrangement of an internal combustion engine as described in claim 1, wherein there is a recirculation path between an exhaust of said engine and said intake manifold.

8. An arrangement of an internal combustion engine as described in claim 1, wherein there is in addition a throttle body before said intake manifold.

9. An arrangement of an internal combustion engine as described in claim 1, wherein there is an inter-cooler before said intake manifold.

10. An arrangement for a four cycle internal combustion engine comprising:
   a plurality of combustion chambers having a respective reciprocating piston mounted therein;
   a fuel injector for injecting fuel to each one of said combustion chambers on a compression stroke of said piston to provide a stratified charge into said combustion chamber during stratified operation and to provide a homogenous charge into said combustion chamber during an intake stroke of said piston during homogenous operation;
   an intake manifold to provide air to said combustion chambers;
   a variable geometry turbocharger to pressurize the air within said intake manifold;
   a throttle body to throttle the air delivered from said turbocharger to said intake manifold; and
   an exhaust manifold receiving exhaust from said combustion chambers; and
   an exhaust gas recirculation bypass between said exhaust manifold and said intake manifold, said exhaust gas recirculation bypass having an exhaust gas recirculation valve mounted therein.

11. A method of operating a four cycle internal combustion gasoline engine with at least one combustion chamber having a reciprocating piston and inlet and outlet valves, said method including the steps of:
   pressurizing said manifold connected with said combustion chamber with a charging device;
   fluidly connecting said manifold with said combustion chamber via said inlet valve on an inlet stroke of said piston;
   injecting a stratified charge with an air fuel ratio generally equal to or exceeding 25 into said combustion chamber to power said engine during said compression stroke of said engine.

12. A method of operating an internal combustion engine as described in claim 11, wherein said inlet manifold is pressurized utilizing a super charger.

13. A method of operating an internal combustion engine as described in claim 11, wherein said manifold is pressurized utilizing a turbocharger.

14. A method of operating an internal combustion engine as described in claim 13, wherein said turbocharger pressurizing said manifold is a variable geometry turbocharger.

15. A method of operating an internal combustion engine as described in claim 11, wherein upon high demands of engine load said injecting of said charge into said combustion chamber is converted to a homogenous lean charge during an intake stroke of said piston having an air fuel ratio between slightly lean of stoichiometric and 24.

16. A method of operating an internal combustion engine as described in claim 11, wherein upon high demand said injecting of said charge into said combustion chamber is during an intake stroke of said piston at a stoichiometric or richer air fuel ratio level.

17. A method of operating an internal combustion engine as described in claim 11, wherein at a high demand said injecting of said charge into said combustion chamber changes to is an intake stroke of said piston at a generally lean homogenous air fuel ratio between stoichiometric and 24 and then at an even higher demand is at a stoichiometric level.

18. A method of operating a four cycle internal combustion gasoline engine with a plurality of combustion chambers, each of said combustion chambers having a reciprocating piston and inlet and outlet valves, said inlet valve fluidly connecting said combustion chamber with a manifold, said method comprising:
   pressurizing said manifold connected with said combustion chambers with a variable geometry turbocharger having movable vanes in the turbine;
   fluidly connecting by said inlet valve said manifold with said combustion chamber on an intake stroke of said piston;
   injecting during low engine speed and torque operation, a stratified charge into said combustion chambers with an air fuel ratio generally equal to or exceeding 24 into said combustion chambers during a compression stroke of said piston to power said engine, and injecting a homogeneous charge with an AFR generally equal or less than 24 and greater than stoichiometric during an inlet stroke of said piston to power said engine under higher engine speed and torque demand, and injecting a stratified charge with an AFR at stoichiometric or richer into said combustion chamber during an inlet stroke of said piston to power said engine during extreme high engine speed and torque demand of said engine.

19. An arrangement of a four cycle, spark-ignited, gasoline internal combustion engine comprising:
   at least one combustion chamber having a reciprocating piston mounted therein;
   a fuel injector for injecting fuel into said combustion chamber;
   a controller for demanding stratified charge operation of said fuel injector during a compression of said piston at relatively low engine speed and torque, said controller demanding said fuel injector to a homogeneous operation at higher engine speed and torque levels;
   an intake manifold to provide air to said combustion chamber;
   a charging device to pressurize the air within said intake manifold.

20. An arrangement as described in claim 19, wherein said engine also has a throttle body and said throttle body is controlled by said controller to set an air-fuel range of said engine.

* * * * *